(12) United States Patent
Kersh et al.

(10) Patent No.: US 12,153,606 B1
(45) Date of Patent: Nov. 26, 2024

(54) APPLICATION OF INTER-ITEM CATEGORY CONSTRAINT FOR UNCATEGORIZED CONTENT ITEMS

(71) Applicant: Amazon Technologies, Inc., Seattle, WA (US)

(72) Inventors: James Zachary Kersh, Austin, TX (US); Manish Landge Nilkanth, Round Rock, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/347,482

(22) Filed: Jul. 5, 2023

(51) Int. Cl.
    *G06F 16/28* (2019.01)
(52) U.S. Cl.
    CPC .................. *G06F 16/285* (2019.01)
(58) Field of Classification Search
    CPC ..... G06F 16/951; G06F 16/903; G06F 16/353
    See application file for complete search history.

(56) References Cited

U.S. PATENT DOCUMENTS

| | | |
|---|---|---|
| 10,860,860 B1 | 12/2020 | Huynh et al. |
| 2015/0189347 A1* | 7/2015 | Oztaskent .......... H04N 21/4722 725/32 |
| 2018/0213277 A1* | 7/2018 | Carney Landow ... G06F 16/903 |

OTHER PUBLICATIONS

Iab, "Video Multiple AD Playlist (VMAP)", Jul. 2014, pp. 1-18.

\* cited by examiner

*Primary Examiner* — Baoquoc N To
(74) *Attorney, Agent, or Firm* — Robert C. Kowert; Kowert, Hood, Munyon, Rankin & Goetzel, P.C.

(57) ABSTRACT

A supplemental content retrieval system receives requests for supplemental content from various content providers, and makes respective requests to supplemental content provider(s). Responses to the requests may be subject to a time limit. The requests to the supplemental content provider(s) may be made in parallel or serially, and may sometimes include information based on responses from another content provider. The supplemental content retrieval system receives responses with content items from the supplemental content providers and, for items in the responses that do not specify a category, determines categories of the items (e.g., based on item metadata, interactive links in the content item, item identifiers for the items, etc.). The supplemental content retrieval system applies a constraint (e.g., an inter-item category constraint or similar, which also may be associated with a time limit) to the categorized items to prepare responses to respective content provider requests.

20 Claims, 6 Drawing Sheets

APPLICATION OF INTER-ITEM CATEGORY CONSTRAINT FOR UNCATEGORIZED CONTENT ITEMS

BACKGROUND

Content providers obtain various forms of supplemental content (enrichment, overlay, other supplemental content, etc.) from various different supplemental content sources. Some content providers rely upon the supplemental content sources to enforce rules about how or what supplemental content is provided by the supplemental content source. Changes to the architecture of the network between the content provider and supplemental content source, or changes to the functionality of the components involved, may introduce technical challenges to optimal delivery of the supplemental content

Figure 1:
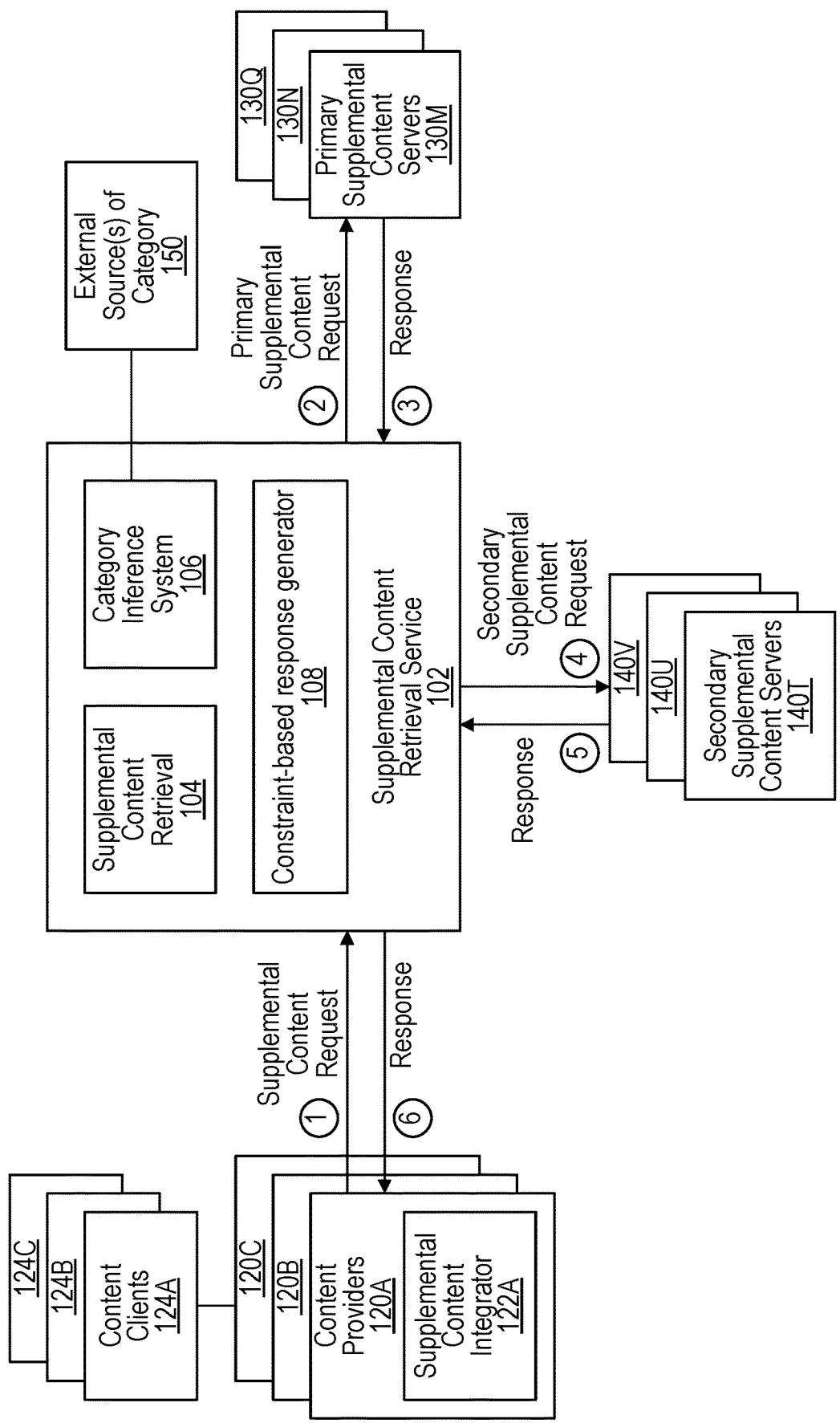
FIG. 1 is a block diagram that illustrate a logical architecture for a system for application of an inter-item category constraint for uncategorized content items, according to some embodiments.

While the solution is described herein by way of example for several embodiments and illustrative drawings, those skilled in the art will recognize that the solution is not limited to the embodiments or drawings described. It should be understood, that the drawings and detailed description thereto are not intended to limit the solution to the particular form disclosed, but on the contrary, the intention is to cover all modifications, equivalents and alternatives falling within the spirit and scope of the present solution. Headings used herein are for organizational purposes only and are not meant to be used to limit the scope of the description.

DETAILED DESCRIPTION OF EMBODIMENTS

As discussed in more detail below, systems and methods of embodiments of application of an inter-item category constraint for uncategorized content items are illustrated and described. As described above, changes to the architecture of a network and/or changes to the functionality of the components involved in delivery of supplemental content to content providers, may introduce technical challenges to optimal delivery of the supplemental content. At least some embodiments herein address such technical challenges by inferring otherwise unknown characteristics of supplemental content items (inferences are performed via various technical solutions) and applying rules to the inferred characteristics of supplemental content items from different sources to ensure the supplement content is provided in accordance with the rules. Some such solutions ensure the supplement content is delivered in accordance with the rules despite changes to the network architecture of and/or changes to the functionality of the components involved in delivery of the supplemental content to the content providers over the network, for example.

At least some content providers (e.g., systems that stream/broadcast content such as but not limited to video on demand, live content, etc. to content consumer user devices (sometimes referred to as content clients, herein) rely upon supplemental content sources. A component of a content provider is a supplemental content integrator. Some content providers supplement the content they are providing to content clients with additional content items (e.g., enrichment content from third parties, overlay content that overlays the main content to enhance the main content, ads inserted into a break in the main content, other supplemental content, etc.). In order to get the supplemental content, the supplemental content integrator of the content provider may send a request to a service (e.g., to a supplemental content retrieval service, described herein). In some instances, the supplemental content integrator expects a sequential response to the request including indications of the supplemental content which it then integrates into the content being provided by the content provider.

In at least some embodiments described herein, systems and methods for application of an inter-item category constraint for uncategorized content items apply a content item category constraint to content items from different sources when content categories are not provided for the content items. For example, at least some supplemental content providers may, in response to requests for supplemental content, determine a group of content items, and apply one or more rules regarding the items in the group (e.g., apply a rule restricting items of content in the group from being in the same category or the like) to ensure the response to the request is in accordance with the rule (e.g., a rule that no two content items fall into a same category, in this example).

In at least some embodiments described herein, the supplemental content requests are requests for a list of supplemental content items and the responses are lists indicating or specifying the supplemental content items (e.g., identifiers, names, metadata and/or the like that identify the supplemental content items), while the actual supplemental content items indicated in the lists are obtained from another source or via a different request. It is contemplated that, in some embodiments, the supplemental content items may be provided in the responses, without departing from the scope of this disclosure.

In embodiments where the supplemental content provider has already applied the rule (a category-based rule or constraint, in this example) the supplemental content provider responds by indicating the supplemental content items without indicating the corresponding categories for the supplemental content items in the response. The response received by the content provider from the supplemental content retrieval service does not include the categories for the content items indicated in the response, in embodiments.

In embodiments, the supplemental content retrieval service receives requests for supplemental content from various content providers, reaches out to other sources (e.g., supplement content servers) for the supplemental content, combines the indications of the supplemental content in accordance with rules (sometimes expressed as constraints, herein) and responds with a group of indications of supplemental content items (e.g., in a sequence, in embodiments). In an example embodiment, the supplemental content retrieval service utilizes primary and secondary supplemental content sources (e.g., supplemental content servers) to prepare and return a response to a request from a content provider for the supplemental content. Embodiments with more, or fewer content sources are contemplated, without departing from the scope of this disclosure.

In embodiments, as part of preparing the response to the content provider's request, the supplemental content retrieval service implements various rules (e.g., a content category constraint mechanism or the like) when combining content items from supplemental content sources (e.g., combining different supplemental content items from the primary supplemental content server with supplemental content items from the secondary supplemental content server). Use of such rules may ensure that the supplemental content is provided to the requesting content provider in a manner consistent with the rules. For example, enforcement of the content category constraint mechanism may reduce the likelihood of the response to the content provider including content items in violation of one or more content category constraint(s). Various different types of constraint are contemplated, such as constraints that apply between items included in the response generated by the supplemental content retrieval service (e.g., an inter-item constraint, applied and enforced by the supplemental content retrieval service when generating the response that includes the supplemental content items from both supplemental content sources). Such inter-item constraints (e.g., a constraint that the supplemental content response from the supplemental content retrieval service to the content provider should not include more than one supplemental content item in the same category) are in contrast to other types of content constraints that apply to the individual content items (e.g., only supplemental content items about cats). It is contemplated that various different types of inter-item rules and inter-item constraints may be applied, such as positive constraints (e.g., only supplemental content items about cats) or negative constraints (e.g., no supplemental content items about cats) in embodiments, In embodiments, the applied rule or constraint (the rule or constraint that is enforced by the system during response preparation) could specify a variable amount of certainty. For example, a strict inter-item constraint could specify "never include multiple items that might be from the same category (e.g., never include a supplemental content item with a supplemental content item of unknown category in a response). Another, more moderate example of an inter-item constraint could specify "do best effort at avoiding multiple items that might be from the same category" (never include multiples of known categories, but random selection or selection of items of unknown categories with low frequencies may be included in the response). Yet another (e.g., low-certainty) inter-item constraint could specify "filling the entire pod is more important than avoiding multiple items from same category, but don't use items from same category if there are enough items to meet that requirement." In embodiments the system may provide (e.g., by default or the like) or present for selection (e.g., by a client or administrator, via an interface) some such rules or constraints for selection by the client to configure the system. In some embodiments, similar type of rules or constraints could be specified by a content provider (e.g., in a request separate from, or along with the request for supplemental content). In some embodiments, similar rules could be specified separately by supplemental content sources, via an appropriate interface, for example, In embodiments, an interface (e.g., a command line (CLI), programmatic (API) or other type of interface (graphical or the like) may provide for client-specification of such certainty levels of rules or constraints. In embodiments, system may enforce a rule or constraint that aligns with or is specified in accordance with, a service level agreement.

Attention is now brought to the Figures. Generally, logical components, systems, and/or service illustrated in FIGS. 1, 2 5, and 6 perform functionality illustrated in process charts 3 and 4. For example, Supplemental Content Retrieval Service 102 may perform some of the steps illustrated in FIGS. 3 and 4. It is contemplated that different, more, or fewer components may perform the functionality illustrated and described herein, without departing from the scope of the disclosure. It is contemplated that functionality illustrated and described herein (e.g., in FIGS. 3 and 4) may omitted, performed in different order and/or integrated with other features, without departing from the scope of this disclosure.

FIG. 1 is a block diagram that illustrate a logical architecture for a system for application of an inter-item category constraint for uncategorized content items, according to some embodiments. FIG. 1 illustrates Content Clients 124A, 124B, 124C. Content Clients 124A-C generally consume content from Content Providers 120A, 120B, 120C. Example Content Clients include, but are not limited to, televisions, game consoles, personal computers, smart phones, tablets and the like.

Content Providers 120A-C are illustrated and include, but are not limited to providers of streaming and/or broadcasting content (video on demand, live content, etc.) to the Content Clients 124A-C. Content Providers 120A-C are illustrated with Supplemental Content Integrator (sometimes called a "stitcher") that integrates supplemental content, obtained from a Supplemental Content Retrieval Service 102, into other content, and the entirety is then transmitted to Content Clients 124A-C. As illustrated in FIG. 1, Content Providers 120A-C send Supplemental Content Requests (1) to Supplemental Content Retrieval Service 102.

In the illustrated embodiment, a Supplemental Content Retrieval process 104 at the Supplemental Content Retrieval Service 102 responds to the Supplemental Content Requests (1) by generating and transmitting Primary Supplemental Content Requests (2) to Primary Supplemental Content Servers 130M, 130N, 130Q. Generally, Primary Supplemental Content Servers 130M-Q are a primary source for supplemental content items. In some embodiments the request (1) from the Content Provider 120A may indicate which Primary Supplemental Content Server 130M-Q to contact, and may include other parameters indicating what type of supplemental content should be requested. In some embodiments, the Content Provider 120A lets the Supplemental Content Retrieval Service 102 select which Primary Supplemental Content Server 130M-Q to contact. Whichever Primary Supplemental Content Server M-Q is selected determines one or more content items to indicate in the response and sends the response (3) to the Supplemental Content Retrieval Service 102, in embodiments. In at least some embodiments, an inter-item constraint applied by the supplemental content retrieval service may be similar to an inter-item constraint applied by the supplemental content servers.

FIG. 1 illustrates that Supplemental Content Retrieval Service 102 sends a Secondary Supplemental Content Request (4) to Secondary Supplemental Content Server(s) 140T, 140U or 140V. In the illustrated embodiment, request (4) is performed subsequent to request (2). But various alternative embodiments are contemplated. For example, Supplemental Content Retrieval Service 102 may send request (2) to a primary supplemental content server 130 after having already obtained supplemental content items from a Secondary Supplemental Content Server 140T-V. In embodiments, Supplemental Content Retrieval Service 102 may include an indication of proposed supplemental content items (e.g., the content items obtained from a secondary supplemental content server 140) in the request to the Primary Supplemental Content Server 130M, sometimes referred to as "header bidding" in an advertising context. In some such embodiments, the Primary Supplemental Content Server 130 may consider those items for inclusion in its response. Alternatively, Supplemental Content Retrieval Service 102 may make a request to a Primary Supplemental Content Server 130 without having first contacted a Secondary Supplemental Content Server 140 and/or without including any indication of proposed supplemental content items in the request. In some embodiments, Supplemental Content Retrieval 104 of Supplemental Content Retrieval Service 102 (e.g., recognizing a possible need for supplemental content items from a Secondary Supplemental Content Server 140T) may send a request to a Secondary Supplemental Content Server 140T in parallel with the request to the Primary Supplemental Content Server 130M, or while waiting on the response from the Primary Supplemental Content Server 130M, or may wait until Supplemental Content Retrieval Service 102 receives the response from the Primary Supplemental Content Server 130M to determine whether the response contains an insufficient quantity of supplemental content items.

FIG. 1 illustrates that a response (5) is received from the Secondary Supplemental Content Server 140T-V.

In embodiments, when there are enough items in the response from the Primary Supplemental Content Server 130M, Supplemental Content Retrieval Service 102 may skip application of unnecessary rules such as an inter-item constraint mechanism (e.g., because content items from a same single source may have had that rule applied at the source of those content items) and prepares the response to the content provider using items from only the response from the primary server.

In embodiments, for the case where the indications of the supplemental content are obtained from two different supplemental content sources, and at least some of the indicated content items have no category indicated in the response, the Category Inference System 106 may infer the categories. For example, Category Inference System 106 may apply any of various techniques to infer the category, such as but not limited to heuristic-based analysis, machine learning model-based analysis, or external system-based inference, etc. Categories are contemplated broadly, herein. For example, categories may include, but are not limited to, consumer goods categories, food categories, business categories, entertainment categories, regional categories, color categories, flavor categories, political categories, language categories, etc.

In embodiments, the constraint applied to prepare the response indicating the content items corresponds to one or more of the types of categories that are inferred. For example, for an inter-item constraint prohibiting two items from the cola category in the response, the Category Inference System 106 may be configured to infer particular categories of beverages. In embodiments, responses from supplemental content providers that do not provide that category (e.g., cola) for content items in the response, directly, are described herein as not including such a category. However, the Category Inference System 106 may infer such a category, based on metadata in the response, such as based on a trademark name in URL or in a tag of the metadata, for example. In such an example, the category "cola" is not included directly in the response from the supplemental content provider, but is inferred from the trademark information in the metadata in the response.

In embodiments, the category may be inferred via various External Sources of Categories 150. The External Sources of Categories may be access via External System Interface 206, in embodiments.

Inferred categories may be stored to an index for re-use later, and the Constraint-based Response Generator 108 applies rules or constraints to the categorized supplemental content items to prepare a response (6) that is sent to the requesting Content Provider 122A. Content Provider 122A integrates the supplemental content with the other (e.g., main) content and transmits the integrated whole content to the Content Clients 124A-C (individually, or as a broadcast), in embodiments.

Figure 2:
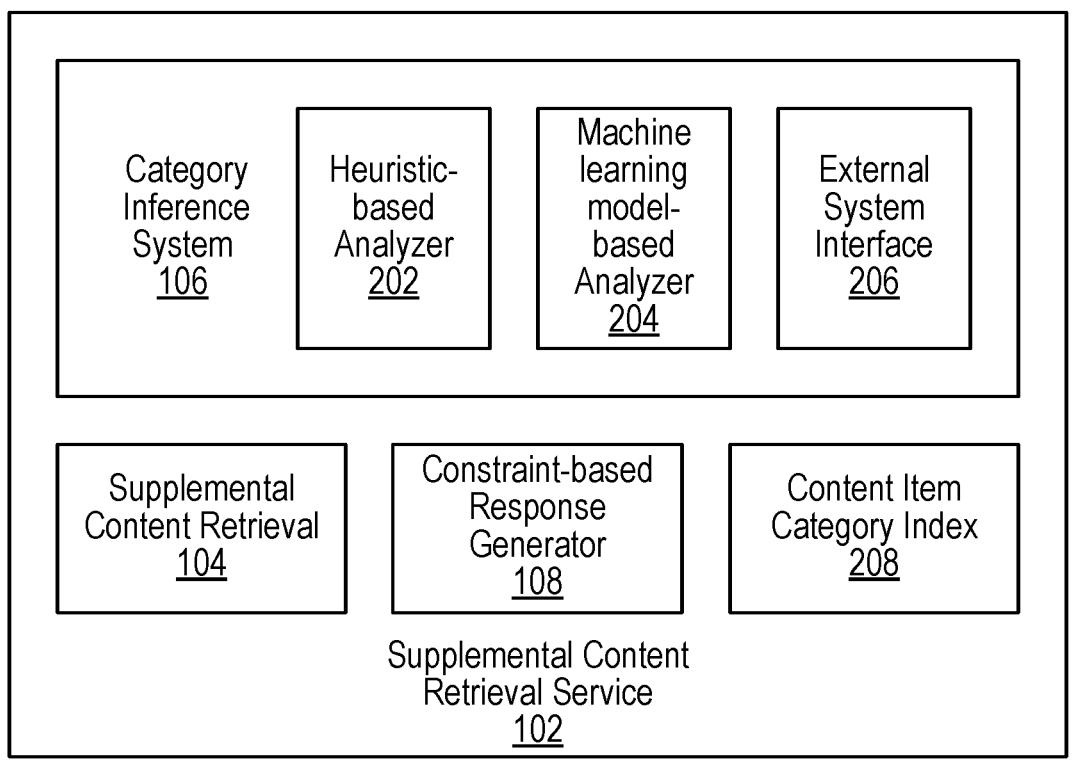
FIG. 2 is a block diagram that illustrate a logical architecture for a supplemental content retrieval service for a system for application of an inter-item category constraint for uncategorized content items, according to some embodiments.
Figure 3:
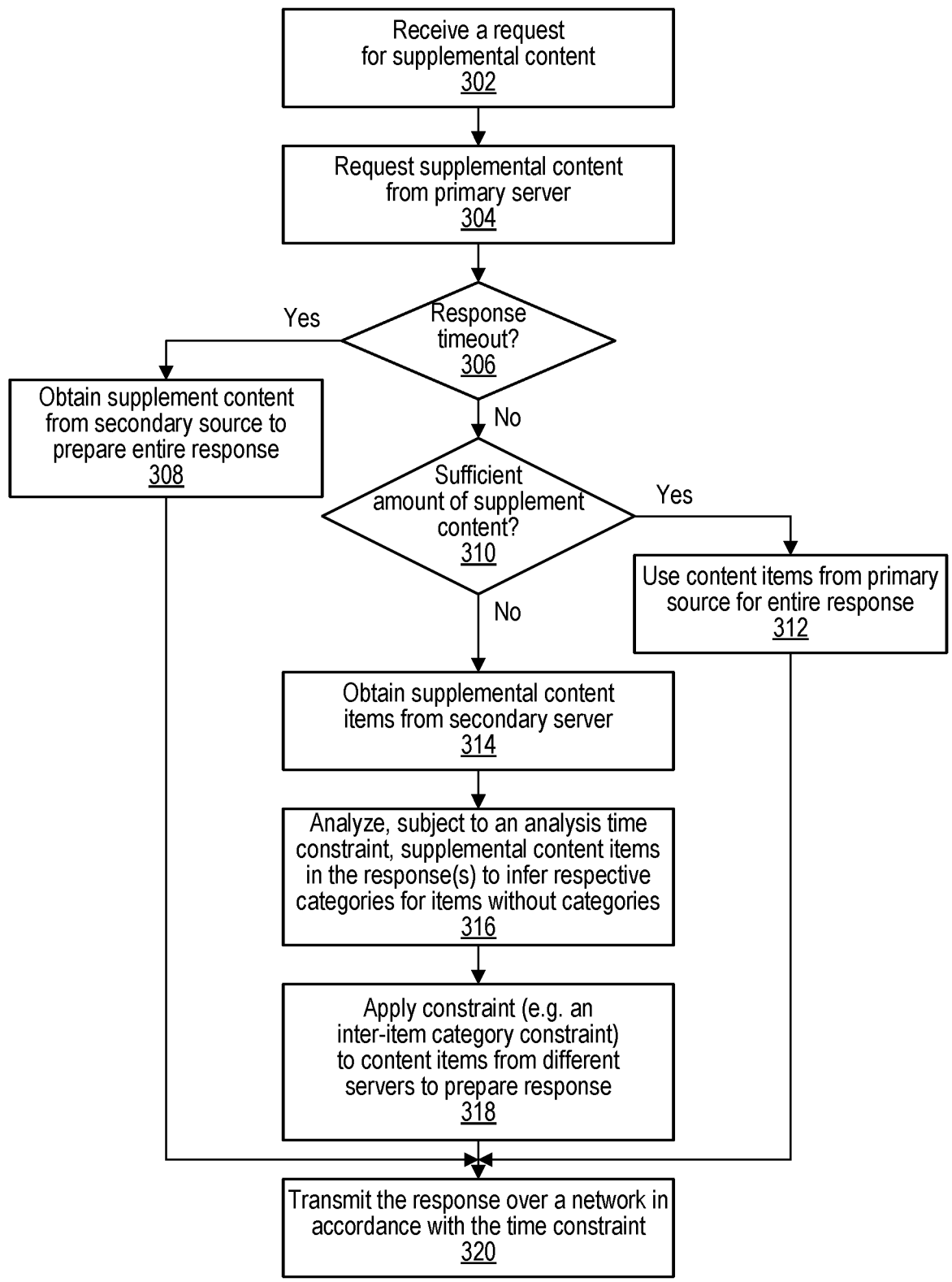
FIG. 3 is a process diagram that illustrates a process for application of an inter-item category constraint for uncategorized content items, according to some embodiments.
Figure 4:
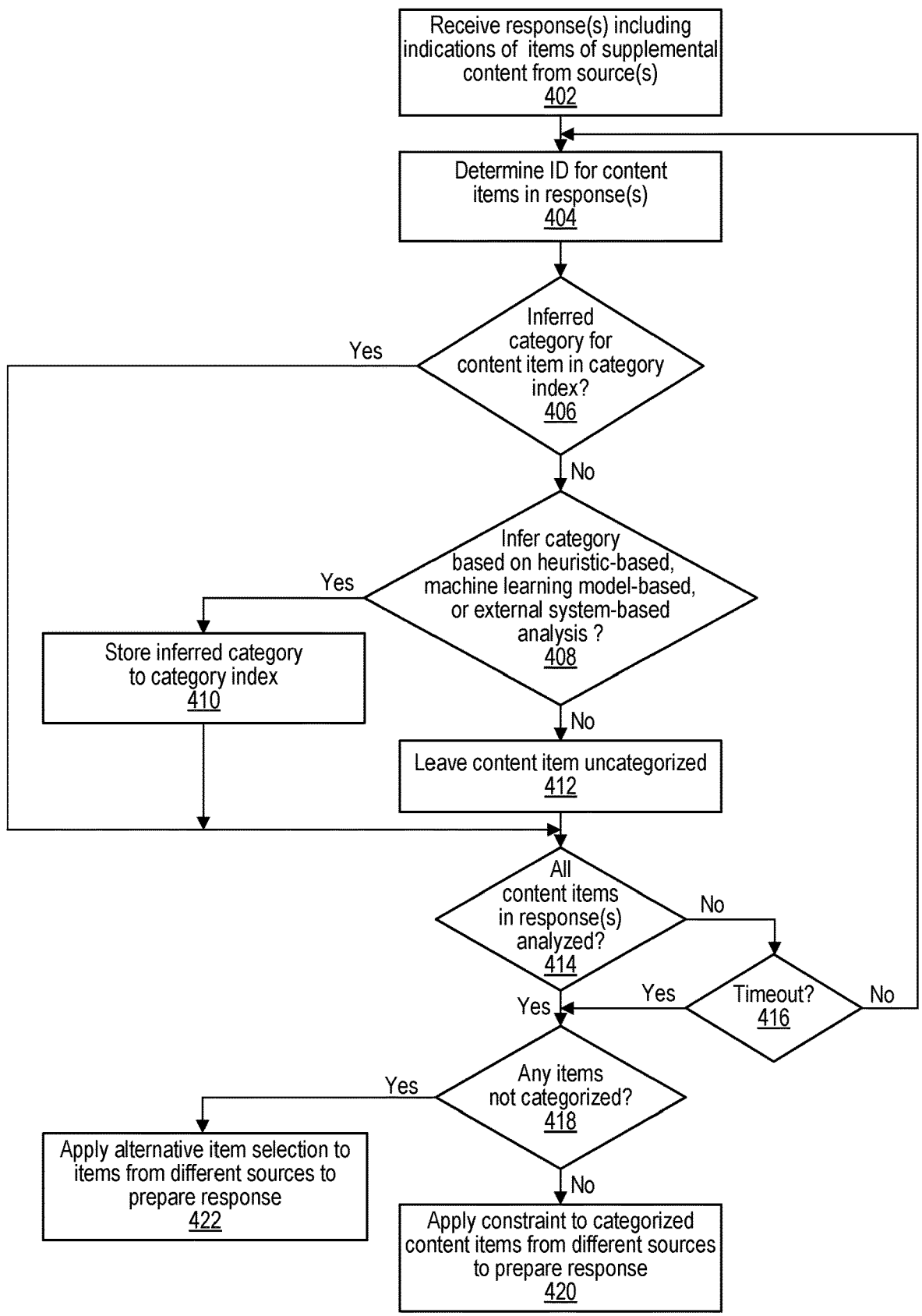
FIG. 4 is a process diagram that illustrates another process for application of an inter-item category constraint for uncategorized content items, according to some embodiments.

FIG. 2 is a block diagram that illustrate a logical architecture for a supplemental content retrieval service for a system for application of an inter-item category constraint for uncategorized content items, according to some embodiments. FIGS. 3 and 4 are process diagrams that illustrate processes for application of an inter-item category constraint for uncategorized content items, according to some embodiments. The functionality illustrated and described for FIGS. 3 and 4 may be performed by one or more components of the Supplemental Content Retrieval Service 102, in embodiments.

As described above for FIG. 1, Supplemental Content Retrieval Service 102 receives requests for supplemental content (block 302) from Content Providers 120A-C and Supplemental Content Retrieval process 104 obtains indications of the supplemental content items from various supplemental content servers 130/140, variously.

Generally, supplemental content items are obtained from two different sources, but may also be obtained from a single source, or from more than two sources. For example, if Supplemental Content Retrieval process 104 requests supplemental content from primary server 130M (block 304) and gets a null response or no response (e.g., within an allotted time in accordance with a time threshold (e.g., in accordance with a service level agreement (SLA))) from the Primary Supplemental Content Server 130M (block 306, No), then Supplemental Content Retrieval process 104 can obtain supplemental content from the secondary supplemental content server 140T (block 308) skip the inter-item constraint mechanism (such a constraint may be unnecessary when preparing a response using items from a single supplemental content server as the server may have already applied such a constraint) and prepare response to the content provider using items from only the response from the Secondary Supplemental Content Server 140U.

In embodiments, the allotted time in accordance with the time threshold is some time less than an overall time for responding to the request from the content provider (e.g., in accordance with a service level agreement (SLA)).

For the case where Supplemental Content Retrieval process 104 requests supplemental content from primary server 130M (block 304) and gets back a list of supplemental content items from the Primary Supplemental Content Server 130M (block 306, Yes), then Supplemental Content Retrieval process 104 can determine whether there are a sufficient amount of supplemental content items in the response to prepare the response to the Content Provider 120A (block 310). If sufficient (block 310, Yes) Supplemental Content Retrieval Service 102 can use the items from the Primary Supplemental Content Server 130M for the entire response to the Content Provider 120A (block 312).

Otherwise, if the response from the Primary Supplemental Content Server 130M has an insufficient quantity of content items needed for the response to the Content Provider 120A, then Supplemental Content Retrieval Service 102 can obtain supplemental content items from the Secondary Supplemental Content Server 140T (block 314), and prepare a response that combines items from the primary and secondary supplemental content servers 130M/140T. In embodiments, the primary and secondary supplemental content servers do not provide categories for their content items, so Supplemental Content Retrieval Service 102 infers a category for each item in order to apply an inter-item category constraint, for example.

Supplemental Content Retrieval Service 102 is illustrated with Category Inference System 106 that analyzes (subject to an analysis time constraint, in the illustrated embodiment) the supplemental content items in the responses from the primary and secondary servers to infer one or more categories for each item indicated in the responses (block 316). In the illustrated embodiment, Heuristic-based Analyzer 202 analyzes metadata in the responses and/or the content from the primary and secondary supplemental content servers. For example, a tag or other metadata may be provided for at least some content items indicated in a response. The Heuristic-based Analyzer 202 may infer a category for an indicated item based on this metadata and/or content. Logical rules or heuristics applied by Heuristic-based Analyzer 202 to infer a category may be implemented as program code. The logical rules or heuristics may be obtained via and/or updated/modified via an interface (e.g., command line interface, application program interface, graphical user interface, or the like) of the Heuristic-based Analyzer 202. The system may provide selectable rules from a data store of selectable rules, or an interface for inputting custom rules/heuristics, in embodiments. For example, an administrator or developer may input new or select pre-programmed rules/heuristics via the interface of the Heuristic-based Analyzer 202.

In the illustrated embodiment, Machine learning model-based Analyzer 204 analyzes metadata and/or content in the responses from the primary and secondary supplemental content servers. For example, a tag or other metadata may be provided for at least some content items indicated in a response. The Machine learning model-based Analyzer 204 may infer a category for an indicated item based on the content and/or metadata. Various types of machine learning may be applied, such as but not limited to supervised learning, or unsupervised learning. For example, a machine learning model may be trained on labeled metadata from a training data set built from prior responses received from the supplemental content servers 130M/140T. The metadata from a recent response from the primary supplemental content servers may processed by the trained model to infer the categories, in example embodiments.

It is contemplated that various types of machine learning may be applied, such as, but not necessarily limited to object recognition, text detection and recognition such as optical character recognition (OCR), speech-to-text and the like (artificial-intelligence powered or otherwise).

A content item indicated in a response from a primary or secondary supplemental content server may include an interactive link (e.g., URL or network address). For example, a supplemental content item may include a "click-thru URL" that a user of the content provider may interact with (click). Heuristic-based Analyzer 202 (or even a Machine learning model) may infer a category for an indicated item based on interactive links provided in one or more content items indicated in the response from the primary and secondary supplemental content servers.

In some embodiments, Supplemental Content Retrieval Service 102 may infer a category by accessing a separate system for the category. In embodiments, an identifier for the content item is determined. For example, an identifier for a supplemental content item may have been provided in the response from the primary or secondary supplemental content servers, or the identifier may be determined by some other means (e.g., via a hash of the supplemental content item, metadata, or similar in the response from the supplemental content server). The determined supplemental content item identifier may be used to lookup or request a category for the item from another system. For example, the other system may be a content item category index 208 created via offline analysis of content items that have been seen or learned or inferred before. In embodiments, the categories inferred above may be saved with corresponding content item identifiers (e.g., to content item category index 208). In embodiments, a separate service provides categories for some content IDs. In embodiments, categories determined from this identifier-based technique are still considered to be inferred categories as the category did not come directly from the primary/secondary source (e.g., the category was not provided in the response from the supplement content servers indicating the list of content items).

Once categories have been inferred for each item (or for the items that could processed within a time limit), Constraint-based Response Generator 108 of Supplemental Content Retrieval Service 102 can apply one or more of the constraints (e.g., a supplemental content item category constraint) to prepare a response to the content provider (block 318). Based on the use of such a constraint, the likelihood any two supplemental content items in the prepared response are of the same category has been reduced (relative to combining items from the primary and secondary servers without inferring categories for the items and without application of the constraint, for example).

The response is transmitted over a network in accordance with the time constraint (block 320).

It is contemplated that the system implements mechanisms to ensure timely responses. For example, the Content Retrieval Service 102 may need to provide a response to the initial content provider request within a certain amount of time (a time constraint). Such time restrictions may correspond to times specified in service level agreements (SLAs) for example. In embodiments, the category inference may be configured to complete within some time limit, while leaving enough time to get the response to the content provider within an overall time constraint.

FIG. 4 is a process diagram that illustrates another process for application of an inter-item category constraint for uncategorized content items, according to some embodiments. At block 402, response(s), including indications of items of supplemental content are received from source(s) (e.g., from supplemental content servers). Identifiers for content items in the response(s) are determined (block 404), as described above in the description of FIG. 3, for example. The process continues to block 406 where Content Retrieval Service 102 may determine whether an inferred category, for content items without a category, appears in the Content Item Category Index 208. If not (block 406, no) the Category Inference System 106 may infer a category based on heuristic-based, or machine learning model based, or external system-based analysis (block 408) as described above for FIG. 3, for example. If a category is successfully inferred (block 408, yes) the inferred category is stored to Content Item Category Index 208 (block 410). If not, the content item may be left uncategorized (block 412). In embodiments, the content item may be left uncategorized because the system was unable to infer the category in an allocated amount of time.

FIG. 4 illustrates that at block 414 the process returns to block 404 and repeats for any remaining content items, unless the process times out (block 416). FIG. 4 illustrate that, once all content items in the response(s) have been analyzed (block 414, yes) the Constraint-based Response Generator 108 determines whether any supplemental content items were not categorized (block 418). If all items have a category (block 420) the Constraint-based Response Generator 108 applies one or more constraints (e.g., an inter-item category-based constraint or similar) to the categorized supplemental content items from different sources to prepare the response to the Content Provider 120A (e.g., a response may include a sequential listing or "pod" of ads, in embodiments).

In embodiments, preparing and transmitting a response may include preparing and transmitting a response that is partially full or incomplete (e.g., if insufficient quantities of supplemental content items are obtained, or if categories of a sufficient quantity of supplement items cannot be determined, for time or technical reasons for example).

FIG. 4 illustrates that if some supplemental content items are not categorized (block 422) the Constraint-based Response Generator 108 applies alternative item selection to the supplemental content items from different sources to prepare the response to the Content Provider 120A. It is contemplated that Supplemental Content Retrieval Service 102 may randomly pick supplemental content items from the secondary server to complete the response. In embodiments, Content Retrieval Service 102 may use an order of the items provided by the secondary server as the order in the response to the content provider. In embodiments, Content Retrieval Service 102 may, if able to infer categories for at least some items in the secondary response, select the item(s) having the rarest category, or a category below some frequency threshold. Some such techniques would provide technically beneficial to the extent they lessen the odds of conflicting with one of the items from the primary response for which a category was unable to be inferred. In some such embodiments, the system could determine and maintain frequency information for the content items and/or categories, which could be used to select the content items from different sources for the response to the content provider.

In some embodiments, the alternative supplemental content item selection applied in box 422 may include dropping the items from, or not including content items that are left uncategorized in, the response to the content providers.

Figure 5:
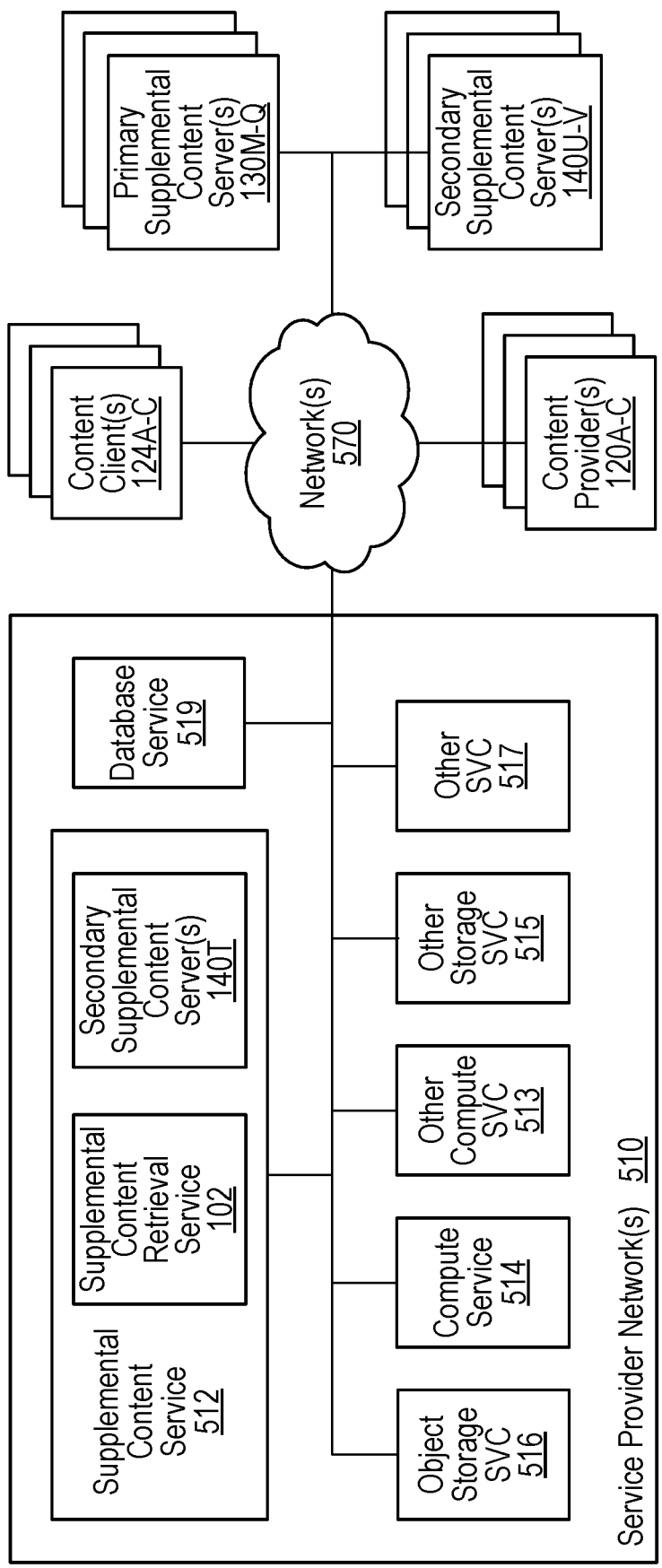
FIG. 5 is a block diagram that illustrates an example service provider network embodiment for application of an inter-item category constraint for uncategorized content items, according to some embodiments.

FIG. 5 is a block diagram that illustrates an example service provider network embodiment for application of an inter-item category constraint for uncategorized content items, according to some embodiments.

As described in embodiments herein, Content Client(s) 124A-C may request content from Content Providers 120A-C. Content Provider 120A-C request supplement content from Supplemental Content Service 512. Supplemental Content Retrieval Service 102 of Supplemental Content Service 512 requests supplemental content items from Supplemental Primary (130M-Q) and/or Secondary Supplement Content Servers (140U-V, 140T) over some combination of external Network 570 and/or Service Provider Network 510. The Supplemental Content Servers 130M-Q and/or 140T-V provide indications of the supplemental content to the Supplemental Content Retrieval Service 102 of Supplemental Content Service 512 that may infer categories from uncategorized ones of the content items and apply an inter-item category constraint to the items from different sources to generate a response indicating a sequence of supplemental content items (all of different categories) in a response sent to the Content Providers 120A-C to integrate with (main) content that is transmitted to the Content Clients 124A-C.

In embodiments, the Service Provider Network(s) 510 may connect and/or host various different services provided by a service provider to clients (e.g., Content Clients 124A-C, such as personal computers or smartphones). FIG. 5 illustrates non-exhaustive example services as Compute Service 514, Object Storage Service 516, Database Service 519, Other Compute Service 513, Other Storage Service 515, and Other Service 517.

Example Computer System

Figure 6:
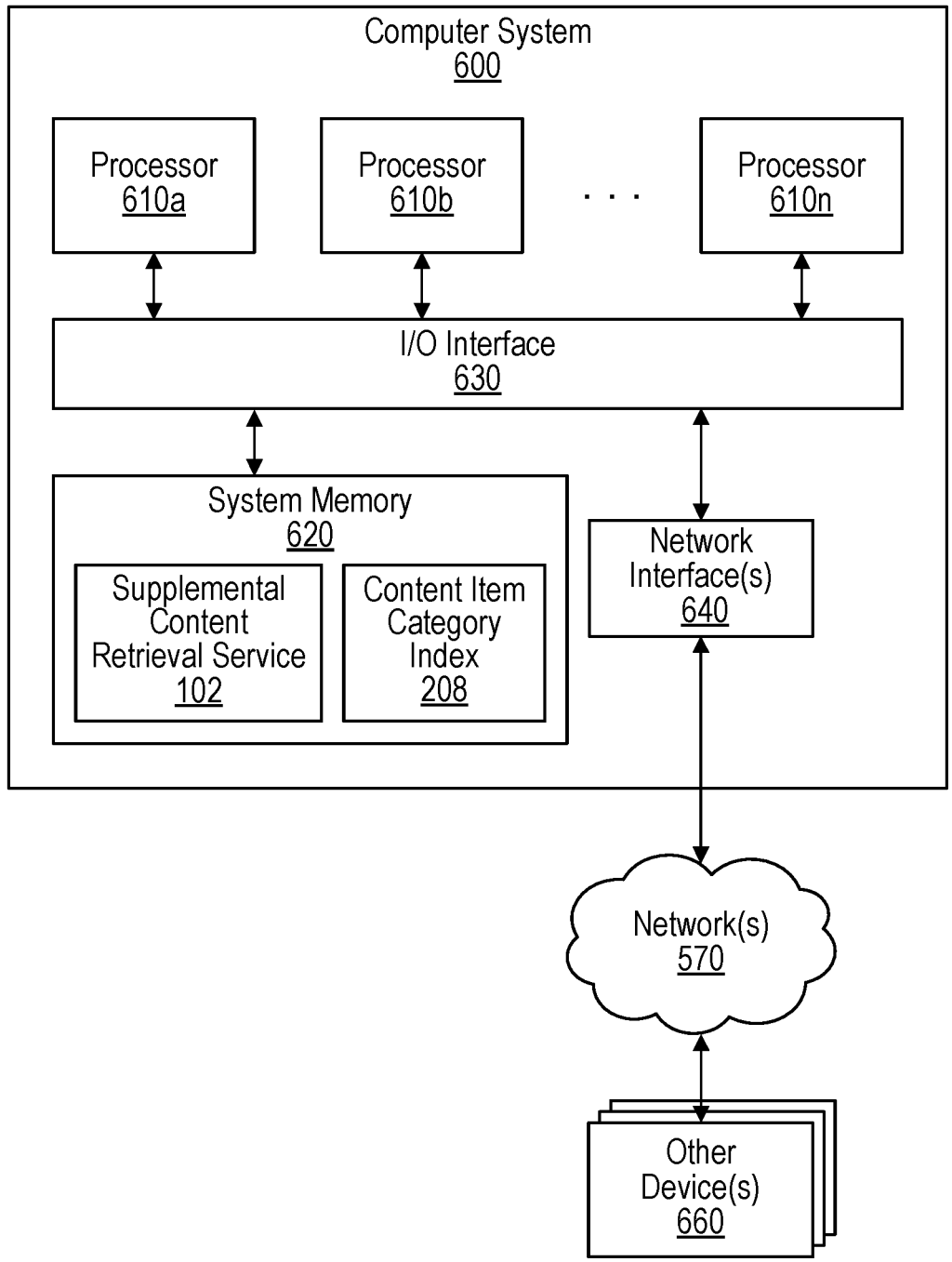
FIG. 6 is a block diagram that illustrate an example of a computer system, one or more of which may implement various components associated with application of an inter-item category constraint for uncategorized content items, according to some embodiments, described and illustrated throughout the disclosure, according to embodiments.

FIG. 6 is a block diagram that illustrate an example of a computer system, one or more of which may implement various components associated with application of an inter-item category constraint for uncategorized content items, according to some embodiments, described and illustrated throughout the disclosure, according to embodiments.

Various portions of systems in FIGS. 1, 2, 5, and 6 and/or methods presented in FIGS. 3 and 4 described herein, may be executed on one or more computer systems similar to that described herein, which may interact with various other devices of the system.

In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 660, such as cursor control device, keyboard, audio device, and display(s). In some embodiments, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

In some embodiments, at least one processor 610 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for a system for application of an inter-item category constraint for uncategorized content items may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 620 may be configured to store program instructions and/or data accessible by processor 610. In various embodiments, system memory 620 may be implemented using any suitable memory technology, such as static random-access memory (SRAM), synchronous dynamic RAM (SDRAM), nonvolatile/Flash-type memory, or any other type of memory. In the illustrated embodiment, program instructions 102 and data 208 implementing desired functions, such as those described above for a system for application of an inter-item category constraint for uncategorized content items, are shown stored within system memory 620 as Supplemental Content Retrieval Service 102 and Content Item Category Index 208. In other embodiments, program instructions and/or data may be received, sent, or stored upon different types of computer-accessible media or on similar media separate from system memory 620 or computer system 600. Generally speaking, a computer-accessible medium may include storage media or memory media such as magnetic or optical media, e.g., disk or CD/DVD-ROM coupled to computer system 600 via I/O interface 630. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 640. Program instructions may include instructions for implementing the techniques described with respect to any of the FIGS.

In some embodiments, I/O interface 630 may be configured to coordinate I/O traffic between processor 610, system memory 620, and any peripheral devices in the device, including network interface 640 or other peripheral interfaces, such as input/output devices. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. In addition, in some embodiments some or all of the functionality of I/O interface 630, such as an interface to system memory 620, may be incorporated directly into processor 610.

Network interface 640 may be configured to allow data to be exchanged between computer system 600 and other devices attached to networks 510/570, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Computing device 600 may include input/output devices that may, in some embodiments, include one or more display terminals, keyboards, keypads, touchpads, scanning devices, voice or optical recognition devices, accelerometers, multi-touch screens, or any other devices suitable for entering or retrieving data by one or more computer system 600. Multiple input/output devices may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Memory 620 may include program instructions (e.g., such as Supplemental Content Retrieval Service 102) and data (e.g., Content Item Category Index 208) accessible by the program instructions. In one embodiment, program instructions may include software elements of a method illustrated in the above figures. Content Item Category Index 208 may include data that may be used in embodiments described herein. In other embodiments, other or different software elements and/or data may be included.

Those skilled in the art will appreciate that computer system 600 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present solution may be practiced with other computer system configurations. In some embodiments, portions of the techniques described herein (e.g., a system for application of an inter-item category constraint for uncategorized content items) may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory computer readable storage medium or media such as magnetic or optical media, (e.g., disk or DVD/CD-ROM), volatile or non-volatile media such as RAM (e.g., SDRAM, DDR, RDRAM, SRAM, etc.), ROM, etc. In embodiments, a computer-accessible/readable medium or media may include a transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
  one or more processors and corresponding memory configured to implement a supplemental content retrieval service configured to:
    in response to a request from a content provider for supplemental content to be integrated with content provided by the content provider, request supplemental content from a first supplemental content server and a second supplemental content server;
    receive respective responses from the first and second supplemental content servers indicating supplemental content items, wherein at least one of the respective responses does not specify categories for at least some of the indicated supplemental content items;
    prepare a response to the request from the content provider including supplemental content items from both the first supplemental content server and the second supplemental content server, wherein the response recognizes an inter-item category constraint, wherein to prepare the response the supplemental content retrieval service is configured to:
      analyze response metadata, or the indicated supplemental content items, from the responses from the first and second supplemental content servers to infer categories for the at least some of the indicated supplemental content items;
      apply the inter-item category constraint using the inferred categories for the indicated supplemental content items to select a plurality of the indicated supplemental content items for inclusion in the response to the content provider, wherein applying the inter-item category constraint using the inferred categories reduces a likelihood of any two supplemental content items included in the response having a same category; and
      transmit the response to the content provider.

2. The system of claim 1, wherein said analyze response metadata, or the indicated supplemental content items to infer categories for the at least some of the indicated supplemental content items, comprises:
  analyze the response metadata or the indicated supplemental content items via a heuristics-based analyzer that uses one or more rules to infer the categories, or via application of machine learning model to the response metadata or supplemental content items to infer the categories.

3. The system of claim 1, wherein said analyze response metadata, or the indicated supplemental content items to infer categories for the at least some of the indicated supplemental content items comprises:
  analyze response metadata comprising tags describing the respective supplemental content item to infer a category for the respective supplemental content item;
  analyze interactive links in the respective supplemental content item to infer a category for the respective supplemental content item;
  determine an identifier for a respective supplemental content item, and infer a category for the respective supplemental content item from an entry in an index of supplemental content items and corresponding categories; or
  determine an identifier for a respective supplemental content item, and request a category associated with the identifier from another system.

4. The system of claim 1, wherein for one or more uncategorized supplemental content items unable to be categorized within the analysis time constraint, the supplemental content retrieval service is configured to, in addition to said apply an inter-item constraint to the one or more first supplemental content items to prepare a response, randomly select one or more of the uncategorized supplemental content items for the response.

5. A method, performed by one or more processors of one or more computing devices, the method comprising:
  receiving, by a supplemental content retrieval service, responses comprising indications of supplement content items from first and second supplemental content servers, wherein at least one of the responses does not specify categories for at least some of the indicated supplemental content items;
  preparing, by the supplemental content retrieval service, a response to a request from a content provider including supplemental content items from both the first supplemental content server and the second supplemental content server, wherein the response recognizes an inter-item category constraint, and wherein preparing the response comprises:
    analyzing response metadata, or the indicated supplemental content items, from the responses from the first and second supplemental content servers to infer categories for the at least some of the indicated supplemental content items;
applying the inter-item category constraint using the inferred categories for the indicated supplemental content items to select a plurality of the indicated supplemental content items for inclusion in the response to the content provider, wherein applying the inter-item category constraint using the inferred categories reduces a likelihood of any two supplemental content items included in the response having a same category; and
transmitting the response to the content provider.

6. The method of claim 5, wherein said analyzing response metadata, or the indicated supplemental content items to infer categories for the at least some of the indicated supplemental content items comprises inferring the category based at least in part on heuristics-based, or machine learning model-based analysis of metadata or content for the respective supplemental content item in the response from the first supplemental content server.

7. The method of claim 6, further comprising:
storing the inferred category and a corresponding supplemental content identifier, for the respective indicated supplemental content item, in a content item category index; and
determining a supplemental content identifier for another indicated supplemental content item for another response;
inferring, using the stored supplemental content identifier to look up the category for the other indicated supplemental content item.

8. The method of claim 5,
wherein the first supplemental content server is a primary source for the indications of the supplemental content items; and
wherein the second supplemental content server is a secondary source for supplying additional indications of supplemental content items when the primary source for the supplemental content items provides an insufficient amount of indications of supplemental content items.

9. The method of claim 5 wherein said analyzing response metadata, or the indicated supplemental content items to infer categories for the at least some of the indicated supplemental content items comprises inferring a category based at least in part on an interactive link in a respective indicated supplemental content item.

10. The method of claim 5, further comprising:
receiving from another content provider, another request for supplemental content;
obtaining, from the first supplemental content server, other indications of supplemental content to prepare a response to the other request;
based on determining that the other supplemental content from the first supplemental content server has a sufficient amount of indications of supplemental content items for the response to the other request,
preparing the response to the other request using the other indications of supplemental content without determining categories for the other indications of supplemental content items in the other indications of supplemental content and without applying the inter-item category constraint to the other indications of supplemental content items in the other supplemental content.

11. The method of claim 5, further comprising:
receiving from another content provider, another request for supplemental content;
obtaining, from the first and second supplemental content server, other supplemental content to prepare a response to the other request:
attempting to infer categories for the other supplemental content from the second supplemental content server;
for one or more content items indicated in the other supplemental content from the second supplemental content server, failing to determine respective categories for the one or more indicated content items; and
preparing a response to the other request that includes all of the other indicated content items from the first supplemental content server and at least one of the one or more uncategorized content items from the second supplemental content server, wherein the at least one uncategorized content item is randomly selected to be included in the response.

12. The method of claim 5,
wherein said content retrieval service is implemented on a service provider network that provides storage and compute services to clients of the service provider network;
wherein said receiving responses comprising indications of supplement content items from first and second supplemental content servers comprises receiving at least one of the responses over a network from a server external to the service provider network; and
wherein said transmitting the response to the content provider comprises transmitting the response to a content provider external to the service provider network.

13. One or more non-transitory computer-readable storage media storing program instructions executable on or across one or more processors to perform:
obtaining, by a supplemental content retrieval service, indications of supplement content items via responses from first and second supplemental content servers, wherein at least one of the responses does not specify categories for at least some of the indicated supplemental content items;
preparing, by the supplemental content retrieval service, a response to a request from a content provider including supplemental content items from both the first supplemental content server and the second supplemental content server, wherein the response recognizes an inter-item category constraint, and wherein preparing the response comprises:
analyzing response metadata, or the indicated supplemental content items, from the responses from the first and second supplemental content servers to infer categories for the at least some of the indicated supplemental content items;
applying the inter-item category constraint using the inferred categories for the indicated supplemental content items to select a plurality of the indicated supplemental content items for inclusion in the response to the content provider, wherein applying the inter-item category constraint using the inferred categories reduces a likelihood of any two supplemental content items included in the response having a same category; and
transmitting the response to the content provider.

14. The one or more non-transitory computer-readable storage media of claim 13, wherein to infer a category for at least some of the indicated supplemental content items the program instructions cause the one or more processors to perform:

inferring the category based at least in part on heuristics-based, or machine learning model-based analysis of metadata or content for the respective supplemental content item in the response from the first supplemental content server.

15. The one or more non-transitory computer-readable storage media of claim 14, wherein the program instructions cause the one or more processors to perform:

storing the inferred category and a corresponding supplemental content identifier, for the respective supplemental content item, in a content item category index; and determining a supplemental content identifier for another supplemental content item for another response;

inferring, using the stored supplemental content identifier to look up the category for the other content item.

16. The one or more non-transitory computer-readable storage media of claim 13, wherein to infer a category for at least some of the indicated supplemental content items the program instructions cause the one or more processors to perform:

inferring a category based at least in part on an interactive link in a respective supplemental content item.

17. The one or more non-transitory computer-readable storage media of claim 13, wherein the program instructions cause the one or more processors to perform:

receiving from another content provider, another request for supplemental content;

obtaining, from the first supplemental content server, other indications of supplemental content to prepare a response to the other request;

based on determining that the other supplemental content from the first supplemental content server has a sufficient amount of indications of supplemental content items for the response to the other request, preparing the response to the other request using the other supplemental content without determining categories for the other supplemental content items indicated in the other supplemental content and without applying the inter-item category constraint to the other supplemental content items indicated in the other supplemental content.

18. The one or more non-transitory computer-readable storage media of claim 13, wherein the program instructions cause the one or more processors to perform:

receiving from another content provider, another request for supplemental content;

obtaining, from the first and second supplemental content server, other indications of supplemental content to prepare a response to the other request;

attempting to infer categories for the other supplemental content from the second supplemental content server;

for one or more content items indicated in the other supplemental content from the second supplemental content server, failing to determine respective categories for the one or more content items; and preparing a response to the other request that includes all of the other indications of supplemental content items from the first supplemental content server and an indication of at least one of the one or more uncategorized content items from the second supplemental content server, wherein the at least one uncategorized content item is randomly selected to be included in the response.

19. The one or more non-transitory computer-readable storage media of claim 13, wherein to perform said analyzing response metadata, or the indicated supplemental content items to infer categories for the at least some of the indicated supplemental content items the program instructions cause the one or more processors to perform:

analyzing response metadata comprising tags describing the respective supplemental content item to infer a category for the respective supplemental content item;

determining an identifier for a respective supplemental content item, and inferring a category for the respective supplemental content item from an entry in an index of supplemental content items and corresponding categories; or determining an identifier for a respective supplemental content item and requesting a category associated with the identifier from another system.

20. The one or more non-transitory computer-readable storage media of claim 13, wherein the program instructions cause the one or more processors to perform:

receiving a second request for supplemental content from another content provider;

requesting supplemental content from the first supplemental content server for the second request:

responsive to determining a timeout condition with regard to the request for supplement content for the second request:

obtaining indications of supplemental content from the second supplemental content server to prepare the response to the second request, wherein the response includes indications of supplement content items from the second supplemental content server and does not include indications of supplemental content items from the first supplemental content server; and transmitting the response over a network to the other content provider.

* * * * *